(12) United States Patent
Morgan

(10) Patent No.: US 8,136,291 B2
(45) Date of Patent: Mar. 20, 2012

(54) DEVICE FOR SUPPORTING A PLANT, FENCE OR OBJECT

(76) Inventor: Wayne Morgan, Soquel, CA (US)

( * ) Notice: Subject to any disclaimer, the term of this patent is extended or adjusted under 35 U.S.C. 154(b) by 176 days.

(21) Appl. No.: 12/590,750

(22) Filed: Nov. 13, 2009

(65) Prior Publication Data

US 2011/0113686 A1    May 19, 2011

(51) Int. Cl.
*A01G 17/06* (2006.01)
(52) U.S. Cl. ............................................. 47/47; 52/155
(58) Field of Classification Search .......... 47/47, 44–46, 47/22.1, 20.1, 31, 70; 52/155
See application file for complete search history.

(56) References Cited

U.S. PATENT DOCUMENTS

| | | | | |
|---|---|---|---|---|
| 202,179 A | * | 4/1878 | Lennon | 52/155 |
| 645,372 A | * | 3/1900 | Paldi | 52/152 |
| 1,153,380 A | * | 9/1915 | Fussell | 52/155 |
| 1,263,132 A | * | 4/1918 | Sharpe | 52/155 |
| 2,125,204 A | * | 7/1938 | Shrewsbury | 47/47 |
| 300,436 A | | 10/1961 | Jaspert | |
| 6,014,837 A | | 1/2000 | Morgan | |
| 6,088,953 A | | 7/2000 | Morgan | |
| 2006/0236620 A1 | | 10/2006 | LaCrosse | |
| 2007/0062109 A1 | * | 3/2007 | Jolley | 47/47 |
| 2008/0271388 A1 | | 11/2008 | Bayly et al. | |

FOREIGN PATENT DOCUMENTS

| | | |
|---|---|---|
| CH | 443 768 | 2/1968 |
| DE | 36 28 634 C1 | 10/1987 |
| DE | G 92 16300.9 | 4/1993 |
| FR | 05 01227 | 8/2006 |
| GB | 458514 | 12/1936 |

* cited by examiner

*Primary Examiner* — Kristen C Hayes
(74) *Attorney, Agent, or Firm* — Patrick Reilly; Colin Fowler

(57) ABSTRACT

A method and device for securely anchoring a plant protection structure is provided wherein a support system includes an anchoring post and a support section. The anchoring post presents a post section and an anchor section, wherein each anchor section is configured to angle away from the longitudinal axis as the anchoring post receives a force that drives the anchor section into the ground. The anchoring post is topped by a support module that may include one or more arms that support and/or help protect at least a portion of a plant or object. The arms are configurable to enable the device to help secure or protect plants or objects in a variety of embodiments as best suited to the needs of the object. The anchoring post may include solid or hollow continuous elongate elements that form both the post section and the anchor section.

18 Claims, 20 Drawing Sheets

DEVICE FOR SUPPORTING A PLANT, FENCE OR OBJECT

FIELD OF THE INVENTION

The present invention relates to the field of supporting plants, fences or objects by structures extending from and anchored below an exposed ground surface.

BACKGROUND OF THE INVENTION

It is often desirable to provide support and protection to plants, fences and object that are located above the exposed surface of the Earth, such as soil, sand, or an agrarian or rural landscape. The prior art includes a plurality of devices intended to anchor a support arm into earth, e.g., clay or topsoil. U.S. Pat. No. 202,179 discloses an "Improvement in Fence-Posts" comprising a slotted a hollow tube that may be driven into the ground. The tube slots are located at the tube end intended for placement into the ground, during which process individual elements of the tube defined by the slots are typically driven apart. The tube elements thus form support legs that angle away from a central axis of the tube body. The tube body is further configured to accept insertion of a solid post that provides support to a vertical fence.

U.S. Pat. No. 1,153,380 also includes a hollow tube with anchor elements defined by slots, but in distinction the slots run most of the length of the hollow tube are sized widely to accept fence wires that extend horizontally through the slots at vertical locations above the supporting earth. The hollow tube therein is itself a fence post that directly intersects with horizontal fence elements that are fastened to the tube. U.S. Pat. No. 1,263,132 discloses a long tube having short, narrow slits, whereby four legs are formed from the slotted end of the tube. Each leg is meant to fan out and away from a longitudinal access of the tube.

Other prior art devices attach anchoring features to a single solid post. U.S. Patent Application Publication Serial No. 20060236620 discloses three solid legs attached to and extending from a unifying solid post. U.S. Patent Application Publication Serial No. 20080271388 presents a solid post having one or more anchoring members, wherein the anchoring member presents both an insertion position and an anchoring position. The anchoring member is formed like a blade that is thinner than the solid insertion post to which the anchoring blade is coupled.

The prior art fails to provide solid elements that are driven into the ground to form both a linear supporting post section above the ground and an anchoring length that after insertion into the ground extends at an angle away from a longitudinal axis of the post section.

SUMMARY OF THE INVENTION

This and other objects of the present invention are made obvious in light of this disclosure, wherein a support system includes an anchoring post and a support module. The support module may be or include one or more arms that support or helps to protect at least a portion of a plant or object. The anchoring post includes two or more elongate elements that are coupled together substantially in parallel along a longitudinal axis, i.e., an elongate axis. The anchoring post presents a post section and an anchor section, wherein each anchor section is configured to angle progressively away from the longitudinal axis as the anchoring post receives a force that drives the anchor section substantially into the ground. The post section may comprise a combination of a post end of each of the elongate elements and the anchor section may comprise a combination of an anchor end of each of the elongate elements, wherein each anchor end extends continuously from a same elongate element that additionally comprises a post end. One or more second elongate elements may include an anchor tine that is configured for insertion into a ground material.

In various alternate preferred embodiments of the present invention, the anchoring post may comprise three or more elongate elements. Each elongate element may present a striking point distal from the anchor sections, wherein a plurality of striking points are disposed substantially proximate to a striking plane that is normal to the longitudinal axis. The striking points may be partially or wholly enclosed by a collar that compresses, maintains, and/or supports the anchor sections in a substantially parallel orientation.

In various still alternate preferred embodiments of the present invention, the anchoring post may be or comprise metal, metal alloy, a solid metal material such as metallic rebar, and/or a suitably rigid but malleable material known in the art. The post sections may alternatively or additionally be welded to each other and/or to one or more metal collars.

According to a first aspect of the method of the present invention, the support module may include one or more arms that are configured to alternately, optionally or additionally support one or more of the following: a. a netting; b. a protective plant cover; c. a tree trunk; d. a plant pot; e. a sign; f. a cistern and enclosed water; g. an animal barrier; h. a branch or other element of a plant extending above ground; and i. a fence.

One or more arms may be or comprise metal, metal alloy, a solid metal material such as metallic rebar, and/or a suitably rigid but malleable material known in the art. One or more arms may be welded to each other, to one or more anchoring posts, and/or one or more metal collars.

According to a second aspect of the method of the present invention, a plurality of support systems are installed to (a.) provide support or be comprised within a fence; (b.) provide support or protection to one or more plants; and/or (c.) at least partially protect or enclose an area.

According to a third aspect of the method of the present invention optionally, alternatively or additionally, a coupling element, such as a flexible tube, may be applied to couple arms of a same support module and/or arms of neighboring support systems. The coupled arms of one or more support modules may be configured and positioned to support a plant, such as a tree, or support a fence or fence element, such as netting.

The foregoing and other objects, features and advantages will be apparent from the following description of aspects of the present invention as illustrated in the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 202,179 (Inventor: Lennon, S. N.; Issued on Apr. 9, 1818) titled "Improvement in fence-posts"; U.S. Pat. No. 1,153,380 (Inventor: Fussell, J. E.; issued on Sep. 14, 1915) titled "Fence-post"; U.S. Pat. No. 1,263,132 (Inventor: Sharpe, G. C.; Issued on Apr. 16, 1918); U.S. Pat. No. 6,088,953 (Inventor: Morgan, W; Issued on Jul. 18, 2000) titled "Collapsible protective plant cover"; U.S. Pat. No. 6,014,837 (Inventor, Morgan, W.; Issued on Jan. 18, 2000) titled "Adaptable plant protector"; U.S. Patent Application Publication Serial No. 20060236620 (Inventor: LaCrosse, W.; Published on Oct. 26, 2006) titled "Ground anchor"; U.S. Patent Application Publication Serial No. 20070062109 (Inventor: Jolley, W. B.; Published on Mar. 22, 2007) titled "Permanent underground staking system ad apparatus for vines and weakly rooted trees"; U.S. Patent Application Publication Serial No. 20080271388 (Inventor: Bayly, et al.; Published on Nov. 6, 2008) titled "Anchoring stake".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention may be better understood with reference to the accompanying specification, wherein.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
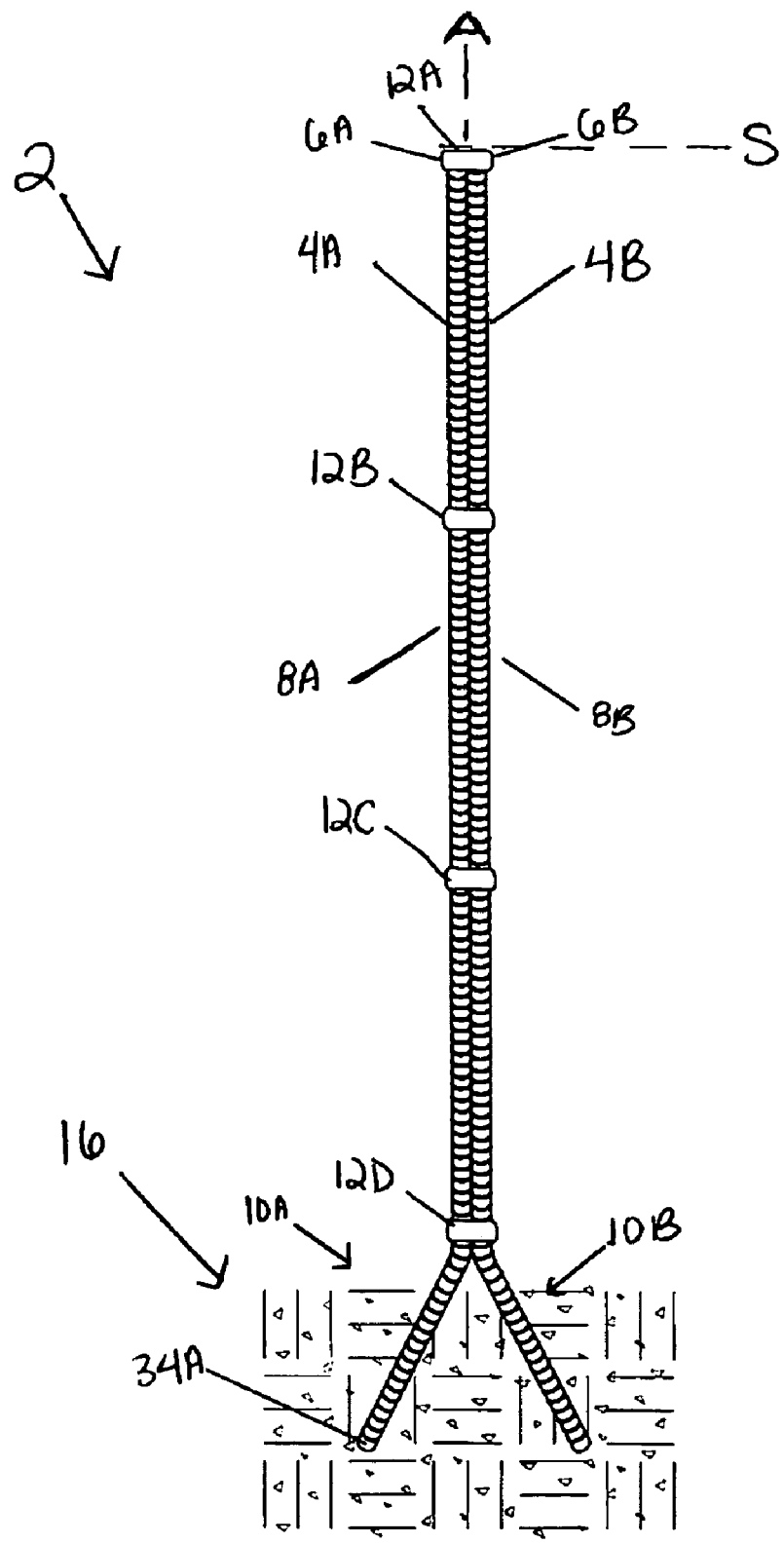
FIG. 1 is an illustration of a first alternate preferred embodiment of the present invention, or first version, that includes two elongate elements.

Referring now to FIG. 1, FIG. 1 is a side view of a first alternate preferred embodiment of the present invention 2, or first version 2, that includes a first elongate element 4A and a second elongate element 4B. Each elongate element 4A & 4B includes a striking end 6A & 6B, an elongate length 8A & 8B, and an anchor end 10A & 10B. One or more of the elongate elements 4A & 4B may be formed by a continuous solid material or a fully or partially hollowed-tube. The first version 2 preferably includes at least two elongate elements 10A & 10B.

The elongate elements 4A & 4B are coupled together at one or more coupling points 12A, 12B, 12C and 12D and held substantially in parallel with an elongate axis A, i.e., wherein each elongate element 4A & 4B is preferably within five degrees of planarity with the elongate axis A along the longest dimension of the respective elongate element 4A & 4B. The coupling points 12A, 12B, 12C and 12D may be or comprise single or combined welds and/or a pressure fitting. Each anchor end 10A & 10B includes a tine 34A & 34B that extends from an anchor coupling point 12D.

A support module 14 configured may be attached to the elongate elements 12A & 12B as depicted in FIGS. 8 through 21 herein.

The anchor ends 10A & 10B of the elongate elements 4A & 4B in combination form an anchor section 16 of the first version 2. The striking ends 6A & 6B and the elongate lengths 8A and 8B of the elongate elements 4A & 4B and in combination form a post section 18 of the first version 2.

Each striking end 6A & 6B further comprises a striking point 20A & 20B that are each located within a same striking plane S.

Figure 2:
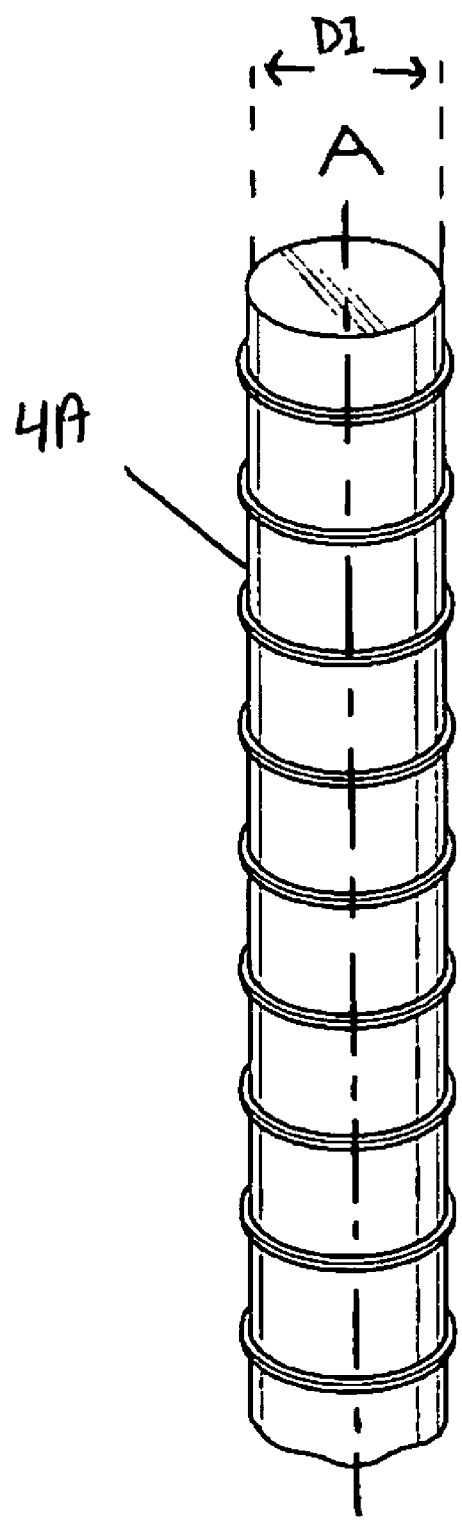
FIG. 2 is a close-up partial view of an elongate element of the first version of FIG. 1.

Referring now to FIG. 2, FIG. 2 is a close-up partial view of an elongate element 4A & 4B. It is understood that certain alternate preferred embodiments of one or more elongate elements 4A & 4B may comprise a length of number three U.S. imperial bar size rebar having a nominal diameter D1 of 0.375 inch. Alternatively or additionally, one or more elongate elements 4A & 4B may be or comprise metal, a metal alloy, a solid metal material such as steel or aluminum, and/or a suitably rigid but malleable nonmetallic material known in the art.

Figure 3:
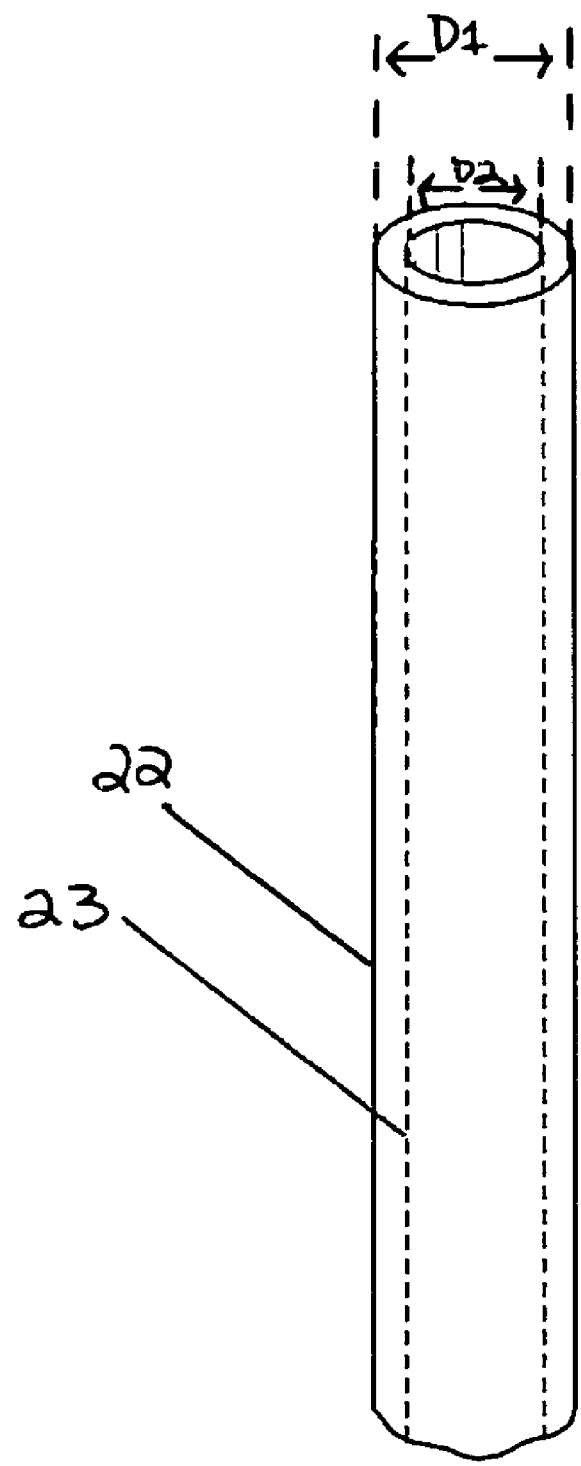
FIG. 3 is a close-up partial view of an alternate, hollowed elongate element of the first version of FIG. 1.

Referring now to FIG. 3, FIG. 3 is a close-up partial view of an alternate elongate element 22, wherein the alternate elongate element 22 is at least partially hollowed and a lumen 23 of the alternate second element 22 has a diameter D2 preferably in the range of 0.90 to 0.20 of a total diameter D1 of the alternate elongate element 22.

Figure 4:
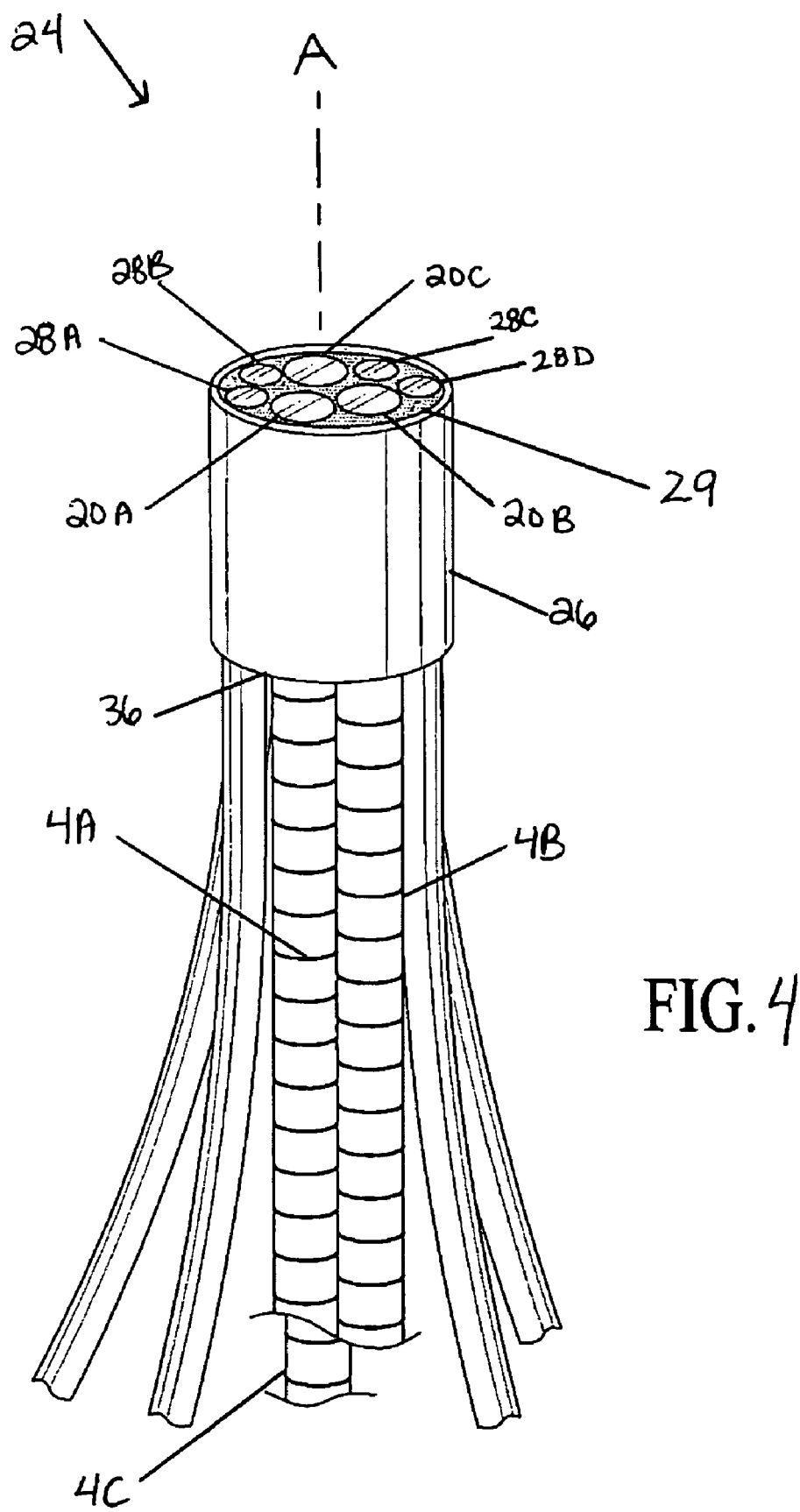
FIG. 4 is a perspective side view of a second alternate preferred embodiment of the present invention having three elongate elements.

Referring now to FIG. 4, FIG. 4 is a close-up partial view of a second alternate preferred embodiment of the present invention 24, or second version 24, configured with three elongate elements 4A, 4B & 4C, a collar 26 and four support arms 28A, 28B, 28C & 28D. It is understood that one or more elongate elements 4A, 4B & 4C may comprise a continuous length of number three U.S. imperial bar size rebar having a nominal diameter of 0.375 inch. Alternatively or additionally, one or more elongate elements 4A, 4B & 4C may be or comprise a continuous length of metal, a metal alloy, a solid metal material such as steel or aluminum, and/or a suitably rigid but malleable nonmetallic material known in the art.

One or more of the support arms 28A, 28B, 28C & 28D may be or comprise an organic plastic material, a nonorganic plastic material, a metal such as aluminum, steel or iron, and/or a metal alloy. In one exemplary preferred embodiment of the present invention, one or more of the support arms 28A-28D may comprise a length of rebar, steel, aluminum or iron having a nominal diameter of 0.250 inch.

The collar 26 may be a press fitting that holds the support arms 28A, 28B, 28C & 28D and the elongate elements 4A, 4B & 4C under compression. Alternately or additionally the collar 26, the support arms 28A, 28B, 28C & 28D and/or the elongate elements 4A, 4B & 4C may be welded together. An optional weld material 29 may be provided to support a welding of the collar 26, the support arms 28A, 28B, 28C & 28D and/or the elongate elements 4A, 4B & 4C. The weld material 29 may alternatively be derived from the process of applying a welding heat to the collar 26, the support arms 28A, 28B, 28C & 28D and/or the elongate elements 4A, 4B & 4C.

The collar 26 may comprise steel, stainless steel, aluminum, iron, a metal, a metal alloy, or other suitable plastic, organic or inorganic material or structure known in the art. The collar 26 of the second version preferably presents a width dimension in parallel with the elongate axis in the range of 0.25 inches to six inches.

The elongate elements 4A, 4B & 4C are coupled together at one or more coupling points 12A, 12B, 12C and 12D and held substantially in parallel with an elongate axis A, i.e., wherein each elongate element 4A, 4B & 4C is preferably within five degrees of planarity with the elongate axis A along the longest dimension of the respective elongate element 4A, 4B & 4C.

Figure 5:
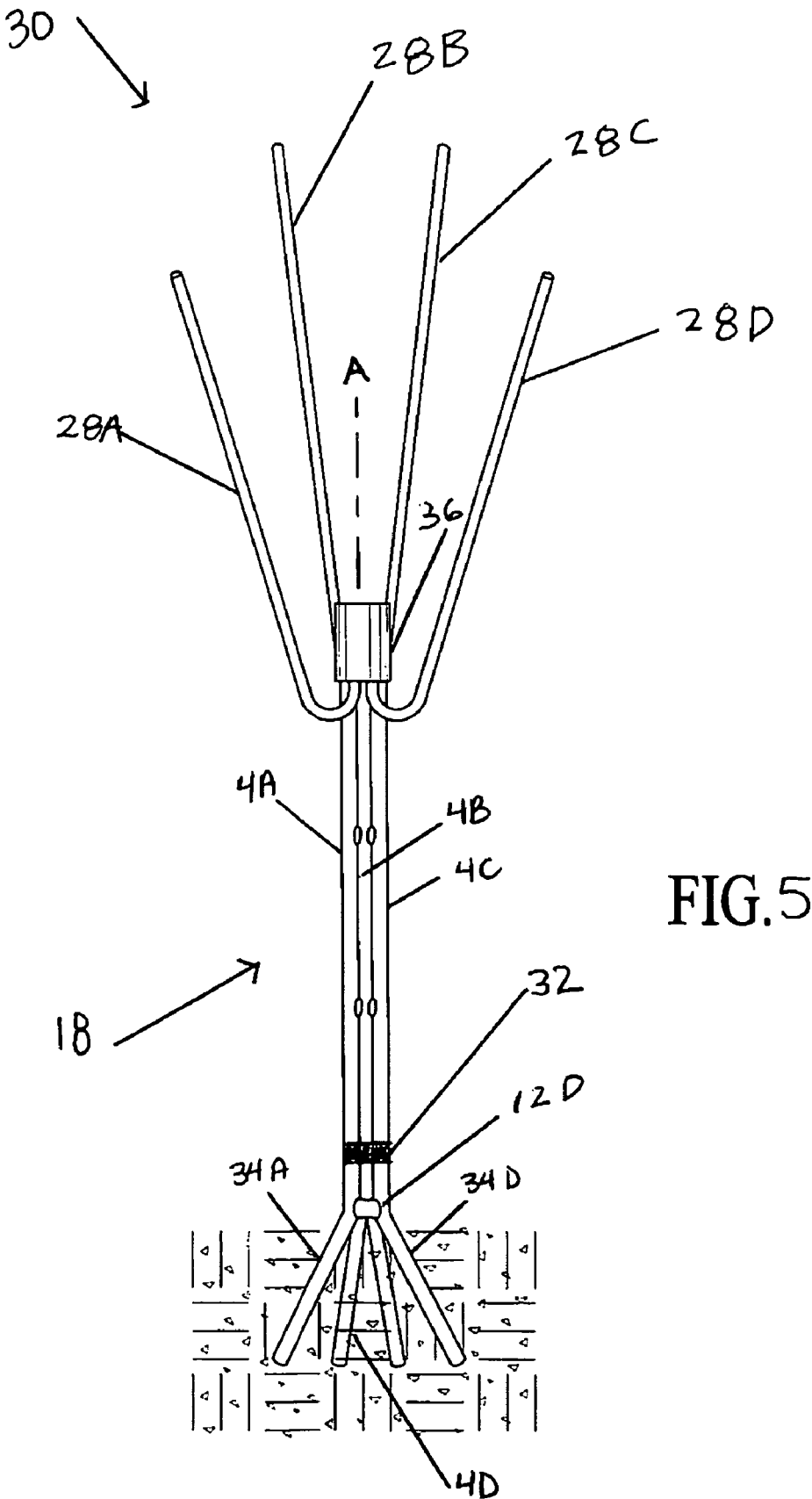
FIG. 5 is a perspective view of a third alternate preferred embodiment of the present invention having four elongate elements and four support arms.

Referring now to FIG. 5, FIG. 5 is a perspective view of a third alternate preferred embodiment of the present invention 30, or third version 30, a depth registration marking 32, having four elongate elements 4A, 4B, 4C & 4D and four support arms 28A, 28B, 28C & 28D. The post section 18 of the third version 30 is formed by the combination of the portion elongate elements 4A, 4B, 4C & 4D that extend from each elongate element striking point 20A-20D to the fourth coupling point 12D.

The depth registration marking 32 is a visual indicator of the position of the post section 18 relative to the ground material 40 whereby a user may visually calibrate the length of the third version 30 that is protruding from the ground material 40 as the anchor section 16 is inserted into the ground material 40. This visual calibration by the user supported by the depth registration marking 32 helps the user to set the anchor section 16 of a single third version 30 at a preferred depth into the ground material 40, and to position a plurality of third versions 30 at approximately a same depth within the ground material 40.

The anchor section 16 of the third version is formed by the fourth coupling point 12D and a plurality of tines 34A-34D of the anchor ends 10A-10D The exemplary elongate elements 4A, 4B, 4C & 4D may each comprise an individual steel reinforcing bar, known as a rebar in the art, wherein each rebar preferably presents a length in the range from 0.5 foot to twelve feet and a cross-sectional diameter preferably in the range of from 0.25 inch to 2.0 inches. Each exemplary elongate element 4A, 4B, 4C & 4D preferably presents an individual length in the range from 1.0 foot to four feet and an individual cross-sectional diameter preferably in the range of from 0.25 inch to 0.75 inch. The exemplary elongate elements 4A, 4B, 4C & 4D most preferably have equal lengths along the elongate axis A. It is understood that certain alternate preferred embodiments of one or more first elongate elements 4A, 4B, 4C & 4D may comprise a length of number three U.S. imperial bar size rebar having a nominal diameter of 0.375 inch. It is further understood that certain alternate preferred embodiments of one or more elongate elements 4A, 4B, 4C & 4D may comprise a length of metric size number ten rebar having a nominal diameter of 9.525 millimeters. The elongate elements 4A, 4B, 4C & 4D each preferably exhibit a yield strength preferably in the range starting from 250 Newtons per square millimeter of area and extending to 500 Newtons per square millimeter of area. Alternatively or additionally, one or more first elongate elements 4A, 4B, 4C & 4D may comprise a continuous length of (a.) American Society for Testing and Materials (hereinafter, "*ASTM*") A 615 Deformed and plain carbon-steel bars; (b.) ASTM A 706 Low-alloy steel deformed and plain bars; (c.) ASTM A 955 Deformed and plain stainless-steel bars; and/or (d.) ASTM A 996 Rail-steel and axle-steel deformed bars.

Alternatively or additionally, one or more elongate elements 4A, 4B, 4C & 4D may be or comprise metal, a metal alloy, a solid metal material such as steel or aluminum, and/or a suitably rigid but malleable nonmetallic material known in the art. In certain still alternate embodiments of the present invention, one or more elongate elements 4A & 4B may be shaped as a hollow tube, or alternatively partially hollowed in some fraction of total length.

One or more of the support arms 28A-28D may be or comprise an organic plastic material, a non-organic plastic material, a metal such as aluminum, steel or iron, and/or a metal alloy. In one exemplary preferred embodiment of the present invention, one or more of the support arms 28A-28D may comprise a length of steel, aluminum or iron having a nominal diameter of 0.250 inch.

Each support arm 28A-28D preferably presents a length no longer than any of the elongate elements 4A-4D. Each arm 28A-28D more preferably presents a length no longer than any of the post sections 14A-14D of the elongate elements 4A & 4B.

The plurality of support arms 28A-28D and the plurality of elongate elements 4A, 4B, 4C & 4D are coupled together by or within the collar 26 by welding and/or by a press fitting 36 formed by the collar 26 as shown in FIG. 4.

The elongate elements 4A, 4B, 4C & 4D are coupled together at one or more coupling points 12A, 12B, 12C and 12D and held substantially in parallel with the elongate axis A, i.e., wherein each elongate element 4A, 4B, 4C & 4D is preferably within five degrees of planarity with the elongate axis A along the longest dimension of the respective elongate element 4A, 4B, 4C & 4D.

Figures 6A, 6B, 6C:
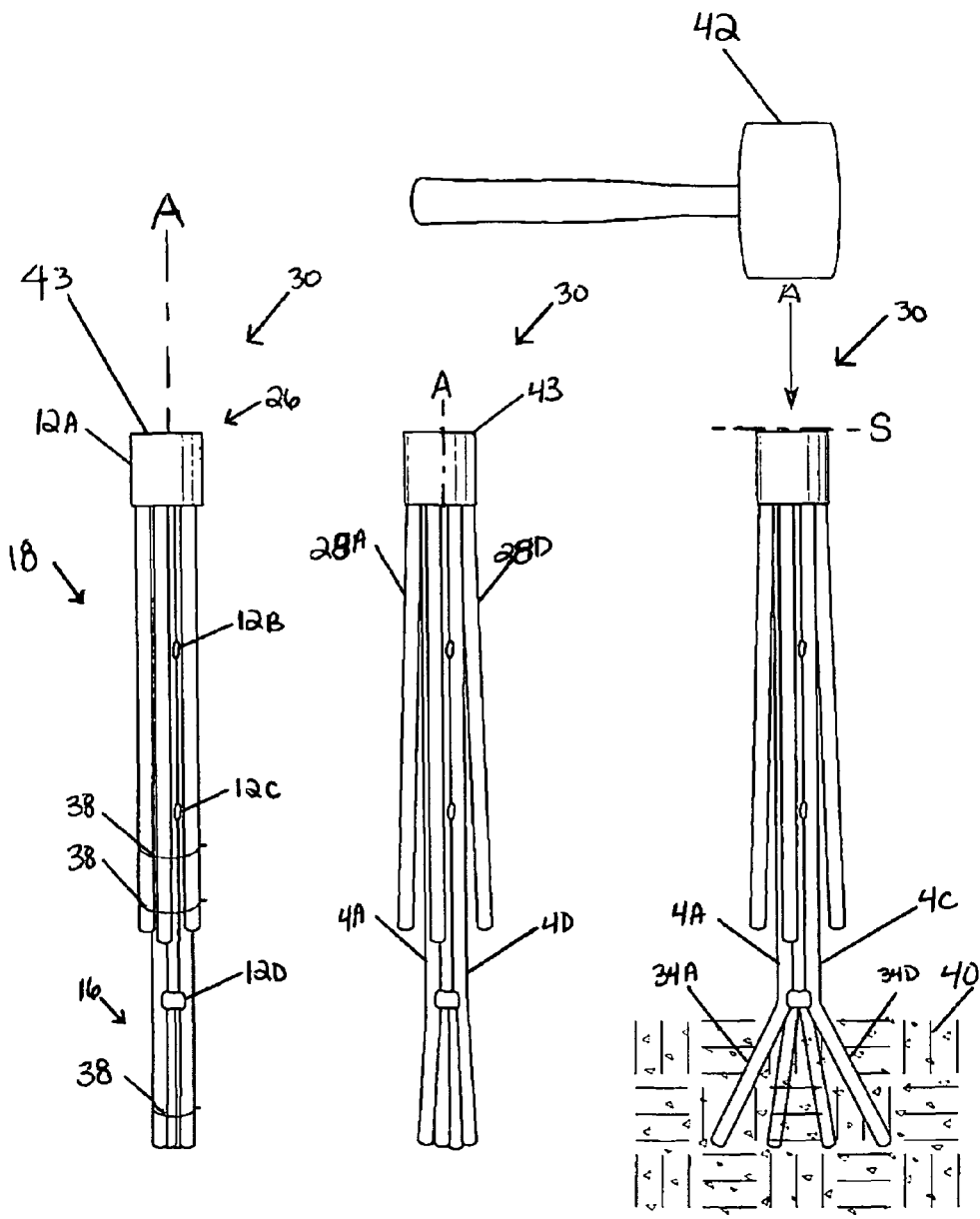
FIG. 6A is an illustration of the third version of FIG. 5, wherein the elongate elements are packaged for shipment.
FIG. 6B is an illustration of the third version of FIG. 5 and FIG. 6A in an unpackaged state and ready for installation.
FIG. 6C illustrates the third version of FIGS. 5, 6A and 6B after an installation in a ground material by means of application of force by a hammer to the elongate elements.

One or more bindings 38 are shown in FIG. 6A that apply compressive force to maintain the first version 2 in a shipping position, or first state of the anchor section 16. The bindings 38 may be metal wire, plastic or other suitable means known in the art.

Referring now to FIG. 6B, FIG. 6B presents the first version 2 with the bindings 38 removed and a plurality of anchor tines 34A-34D that are optionally preformed to angle away from the elongate axis A in a second state of the anchor section 16.

A user may manually, or optionally with the aid of a manual or powered tool, adjust the angle of the tines 34A-34D relative to the elongate axis A after the bindings 38 have been removed from the anchor section 16. This user adjustment of the tine orientation in the second state enables the user to compensate for an observed or expected conditions of the ground material 40 and with the purpose of inserted the anchor section 16 into a more preferred orientation within the ground material 40.

Figure 7A:
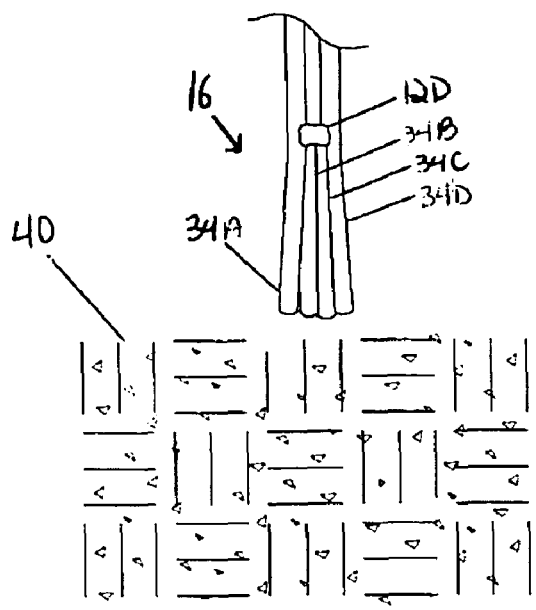
FIG. 7A is a close-up view of an anchor section of the third version of FIGS. 5 and 6A-6C positioned above the ground material of FIG. 6C.
Figure 7B:
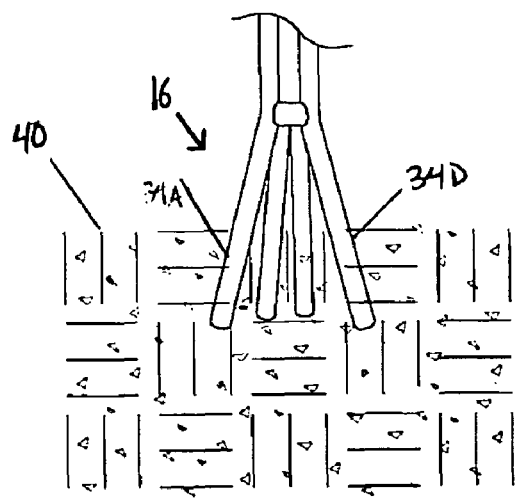
FIG. 7B is a close-up view of the anchor section of the third version of FIGS. 5, 6A-6C and 7A partially inserted into the ground material of FIGS. 6C and 7A.
Figure 7C:
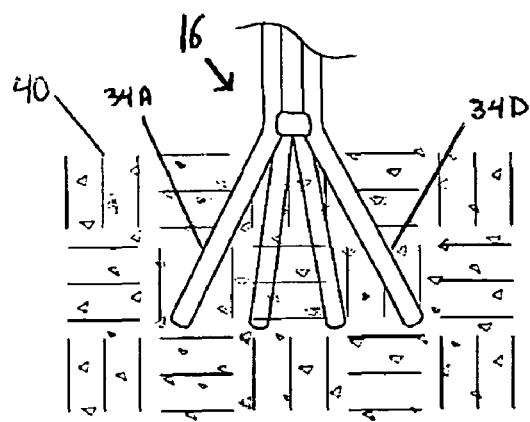
FIG. 7C is a close-up view of the anchor section of the third version of FIGS. 5, 6A-6C and 7A-7B fully inserted into the ground material of FIGS. 6C and 7A-7B.
Figure 8:
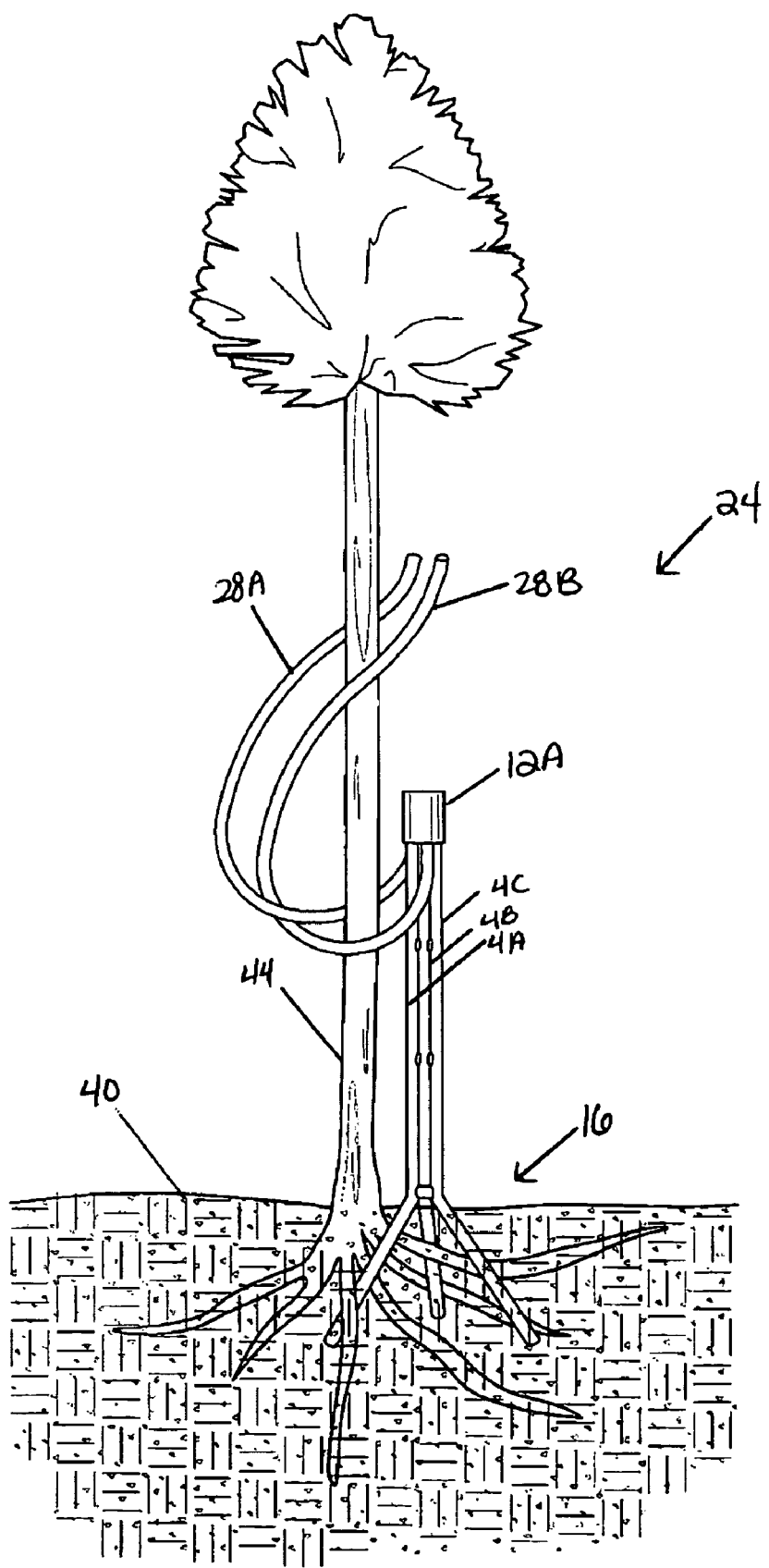
FIG. 8 is an illustration of the second version of FIG. 4 that includes three elongate elements, the collar, and two support arms positioned to constrain a tree trunk.

Referring now to FIGS. 6C, 7C and 8, the third version 30 is shown fully installed into a ground material 40 in a third state of the anchor section wherein each anchor tine 34A-34D is further splayed away from the elongate axis A as a consequence of having receiving a force delivered by a hammer 42 at a plurality of striking points 26A-26D of the first elongate elements 4A, 4B, 4C & 4D. The striking points 20A-20D of each elongate element 4A-4D are located within the striking plane S.

A top collar edge 43 may be positioned in various alternated embodiments of the third version 30 to lie (a.) below the striking plane S; (b.) within the striking plane S; or (c.) above the striking plane S. It is preferable in certain other alternate preferred embodiments of the present invention that the striking points 20A-20D are positioned within the striking plane S and the top collar edge 43 is located below the striking plane S by a displacement in the range of from 0.125 inch to 0.250 inch, whereby the hammer 42 may deliver force directly to the plurality of first elongate elements 4A, 4B, 4C & 4D by direct physical contact with the striking points 20A-20D.

Referring now to FIG. 7A, FIG. 7A is a close-up view of an anchor section 16 of the third version 30 positioned above the ground material 40. The ground material 40 may be or comprise a supporting material such as soil, earth, sand, artificial ground covering, and/or exposed Earth surface.

FIG. 7B is a close-up view of the anchor section 16 of the third version 30 partially inserted into the ground material 40 as a consequence of a downward force being delivered to the striking points 20A-20D. The plurality of anchor tines 34A-34D of the anchor section 16 are splayed further away from the elongate axis A as the anchor section 16 is driven further into the ground material 22. More particularly, each anchor end 10A-10D comprising one individual anchor tine 34A-34D may splay further from the elongate axis A as the anchor section 16 is forced into the supporting ground material 40.

FIG. 7C is a close-up view of the anchor section 16 of the third version 30 fully inserted into the ground material 40, wherein the plurality of anchor tines 34A-34D are further splayed away from the elongate axis A.

The placement of the anchor tines 34A-34D in the splayed position of FIG. 7C provides the post section 18 with a superior stability of the anchor tines 34A-34D that is achieved by the spreading process represented in FIGS. 6A-6C and FIGS. 7A-7C. This transition of the anchor tines 34A-34D from the second state of the anchor section 16 shown in FIGS. 6B and 7A to the third state of the anchor section 16 shown in FIGS. 6C and 7C produces an advantageous form of anchoring. The splaying of the anchor tines 20A-20D from the elongate axis A enables the present invention and the second version 24 and then third version 30 particularly, to be more securely wedged into the ground material 40.

The advantageous third state of the anchor section 16 is also a result of the tines 34A-34D deflecting off of obstructions located within the ground material, e.g., rocks and tree roots. In contrast, rigid prior art anchoring systems typically do not allow anchoring components thereof to conform or to deflect around or off of ground material obstructions. These more rigid prior art systems therefore limit the flexibility of positioning of an anchoring post within certain ground materials 40, whereas the method of the present invention provides an anchor section 16 that supports positioning of the attached post section 18 at a desirable or acceptable orientation in a wider variety of ground materials 40.

The third state of the anchor section 16 of FIGS. 6C and 7C presents a placement of the tines 34A-34D in the ground material 40 that is better able to resist wind flow from multiple directions, and more stably support unbalanced loading and offset loading caused by the weight of, and forces delivered from, the support arms 20A-20D.

In addition, as a user repositions the support arms 28A-28D of the support module, the user will typically delivers a force component that will act to pull the anchor section 16 up and out of the ground material 40 and/or deliver torque forces to the tines 34A-34D. The third state of the anchor section 16 enables the third version 30 to better resist these forces of uplift and torque as instantiated when a user prepares the support arms 28A-28D for plant or structure protection application after the anchor section 16 has been inserted into the ground material 40.

It is understood that each anchor tine 34A-34D is preferably formed from a continuous material that in total length forms an individual first elongate element 4A, 4B, 4C FIG. 8 illustrates the second version 24, that includes three elongate elements 4A, 4B, & 4C, the collar 26, and two support arms 28A & 28B. The support arms 28A & 28B initially extend from the collar 26 and may be positioned to support a variety of plants and structures, such as a trunk 44 of a tree 46 as pictured in FIG. 8. The support arms 28A & 28B may be positioned to constrain motion of the tree trunk 44.

Figure 9:
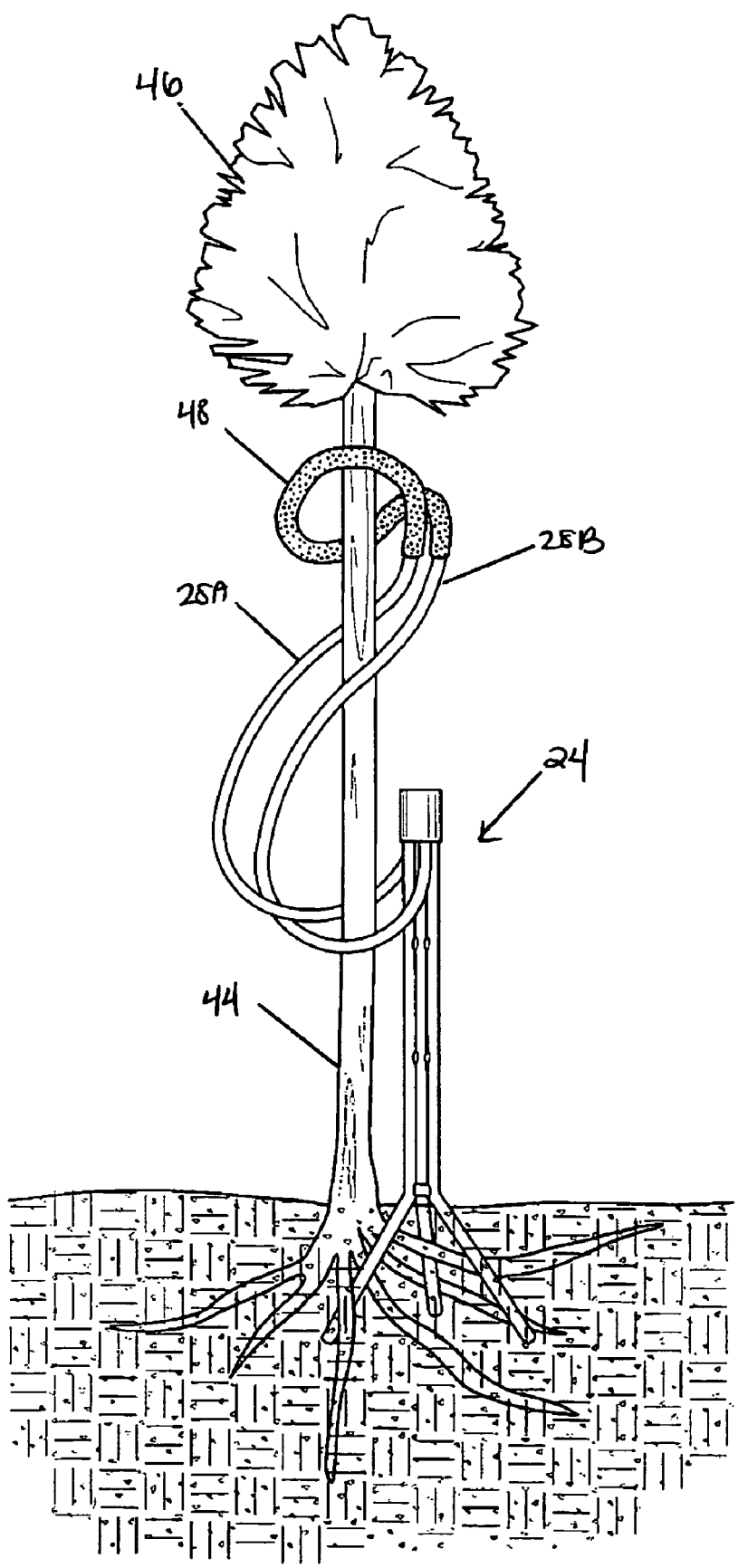
FIG. 9 is an illustration of the second version of FIGS. 4 and 8 combined with a coupling element to constrain the tree trunk of FIG. 8.

FIG. 9 illustrates the second version 24 additionally including an optional coupling element 48 used to mechanically couple the two support arms 28A & 28B and to more stably constrain motion of the tree 46.

Figure 10:
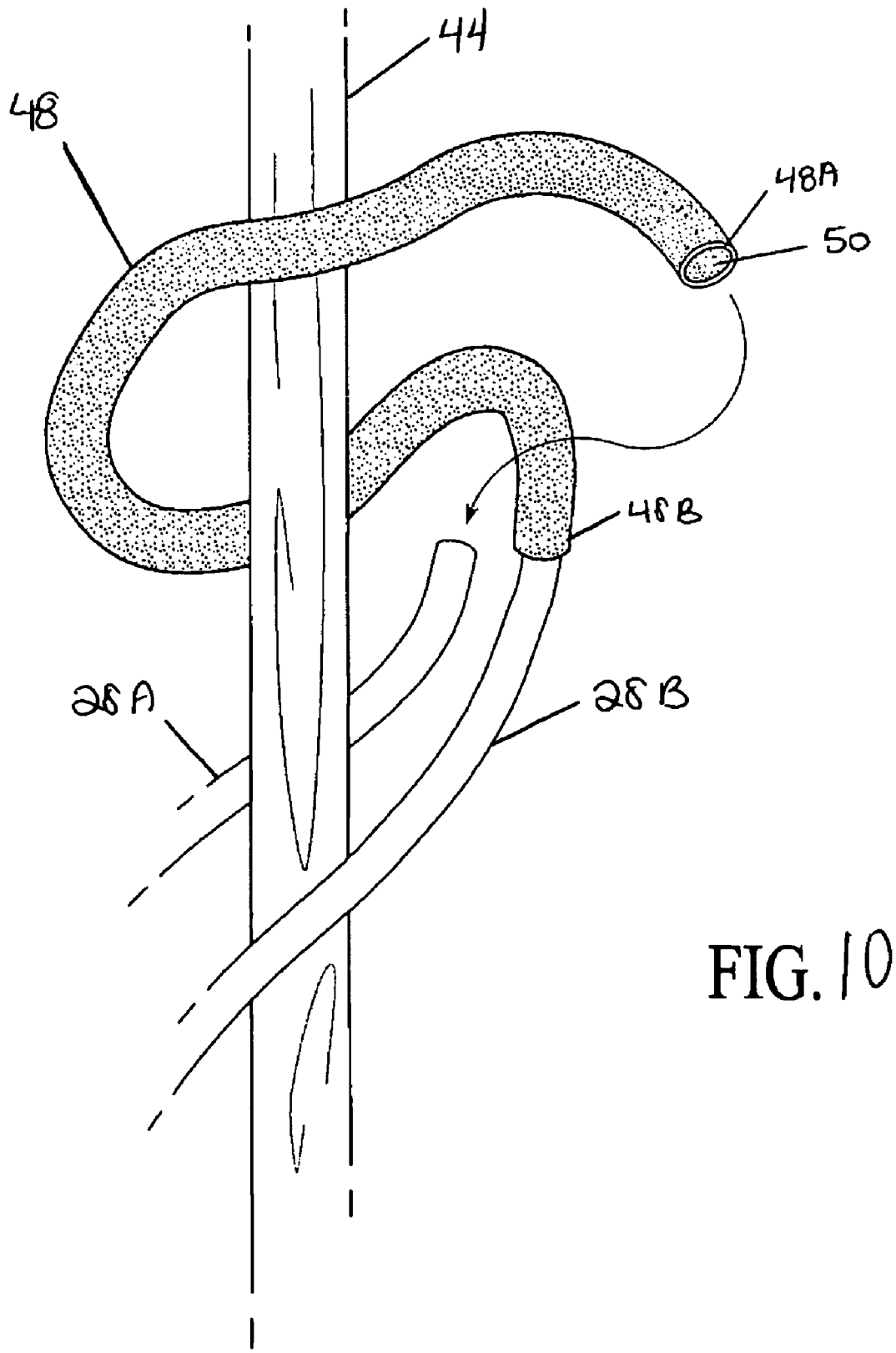
FIG. 10 is a close-up partial view of the support arms of the second version of FIGS. 4, 8 and 9 and the coupling element of FIG. 9.

FIG. 10 illustrates the coupling element 48, wherein the coupling element 48 may comprising a hollow flexible rubber or plastic tube with two hollowed ends 48A & 48B, wherein each hollowed end 48A & 48B is sized to enable a friction fit with a support arm 28A & 28B. Each coupling element end 48A & 48B presents a coupling aperture 50 sized to enable an interference fit with a support arm 28A & 28B by insertion of the support arm 28A & 28B into the coupling aperture 50.

Figure 11:
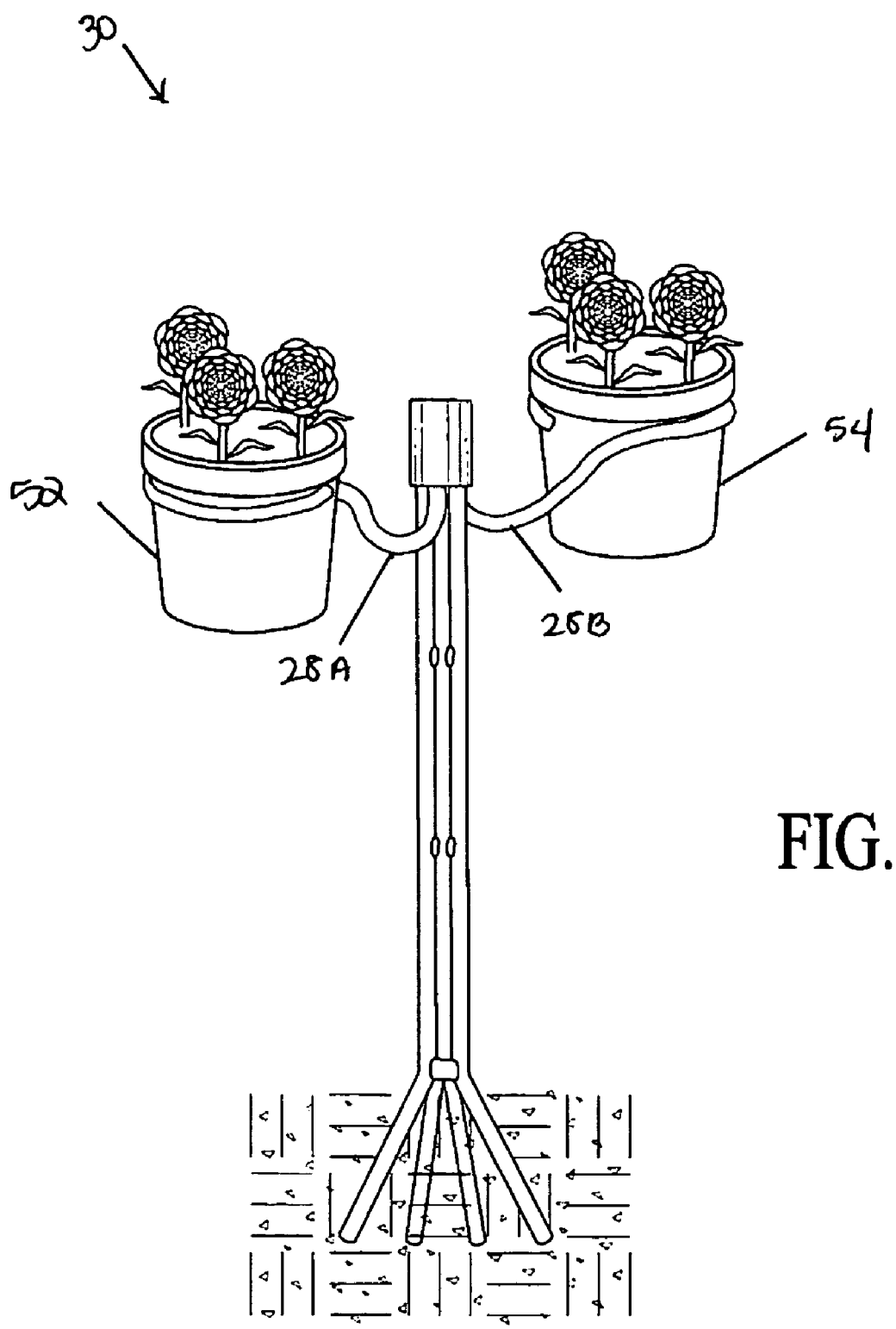
FIG. 11 is an illustration of the third version of FIG. 5 positioned to support a plant pot and a flower pot.

FIG. 11 illustrates an alternate configuration of the second version 24, wherein one or more support arms 28A & 28B are positioned to substantially or partially enclose, and support, a container, such as a plant pot 52 or a flower pot 54. An additional optional plurality of press fit coupling features 56A-56D more proximate to the anchor tines 34A-34D than the collar 26 are presented in FIG. 11, wherein the optional additional plurality of press fit coupling features 56A-56D support a rigidity of the post section 18 of the second version 24 by combined alignment in parallel with the elongate axis A of each of the elongate elements 4A-4D.

Figure 12:
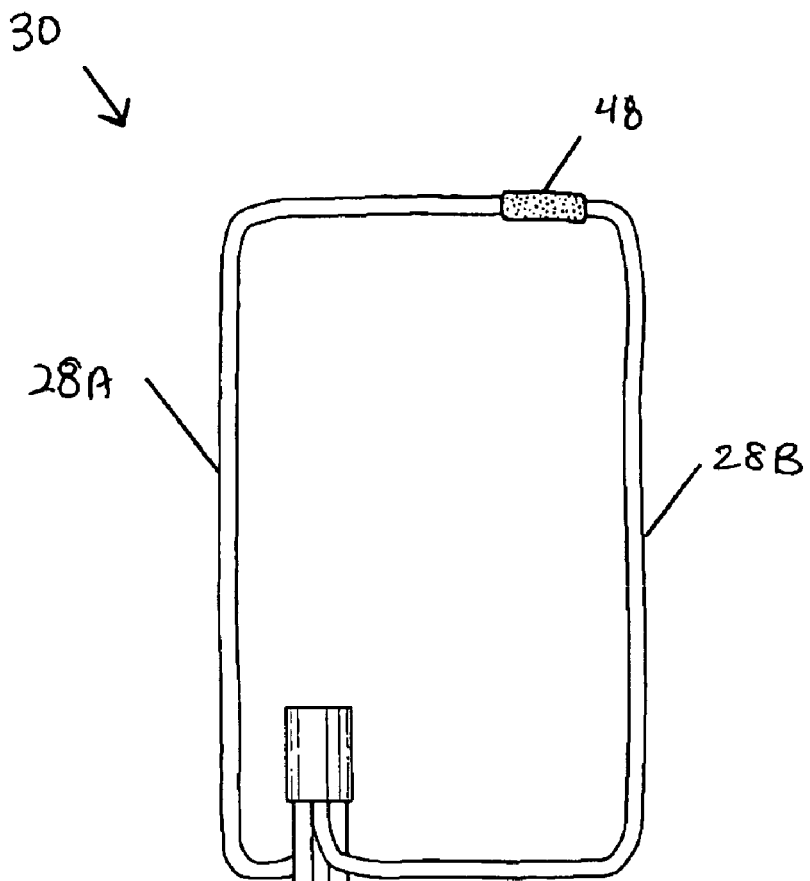
FIG. 12 is an illustration of the third version of FIGS. 5 and 11 having two support arms configured into a rectangular outline.

FIG. 12 illustrates a still alternate configuration of the second version 24, wherein two support arms 28A & 28B are positioned to form a rectangular border shape. The optional coupling element 48 additionally may be applied to stabilize the two support arms 28A & 28B in the rectangular border shape.

Figure 13:
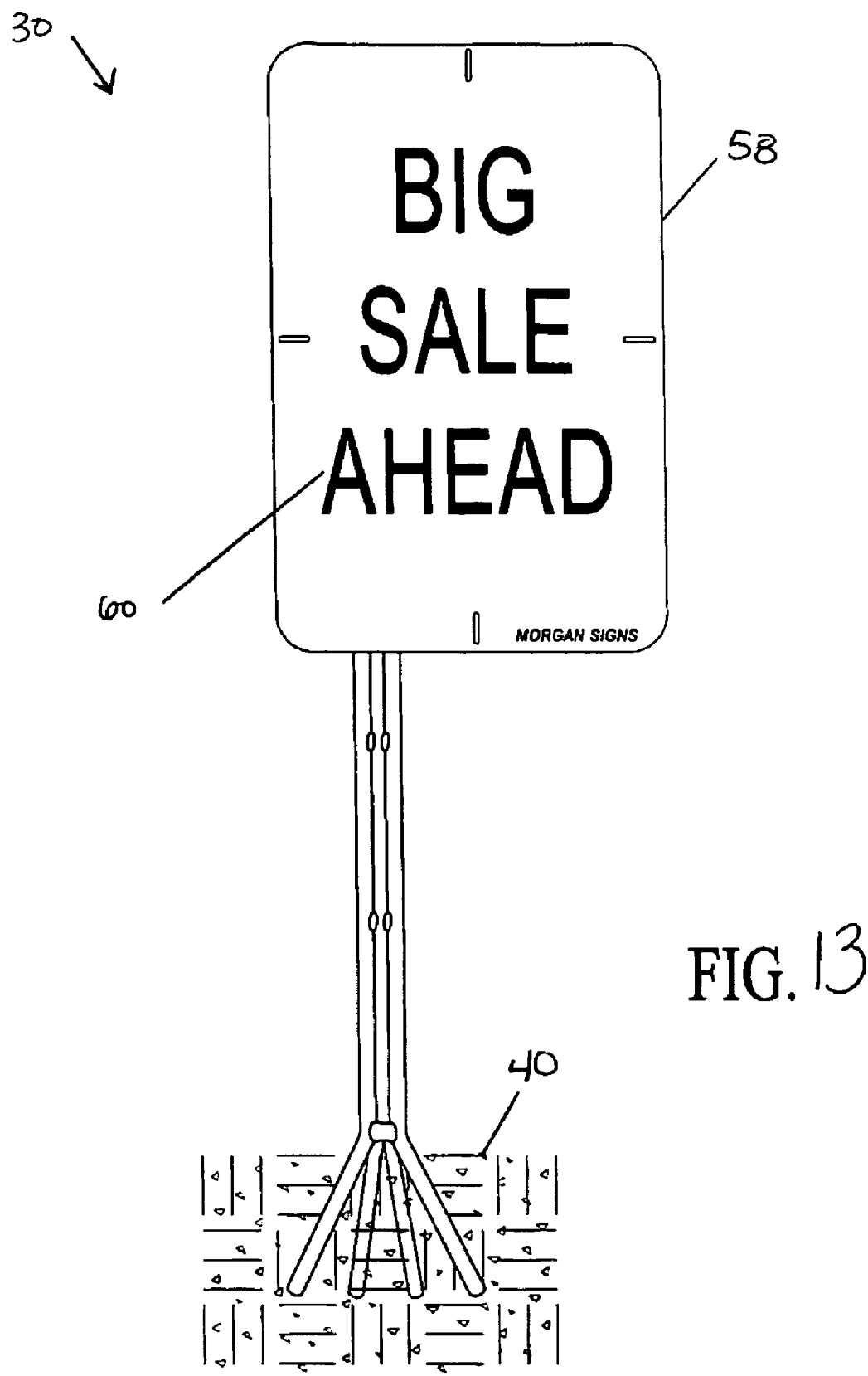
FIG. 13 is an illustration of the third version of FIGS. 5, 11 and 12 further comprising a visual sign.

FIG. 13 illustrates the alternate configuration of the second version 24, wherein a sign material 58 bearing a visual signage 60 is installed upon the support arms 28A & 28B.

Figure 14:
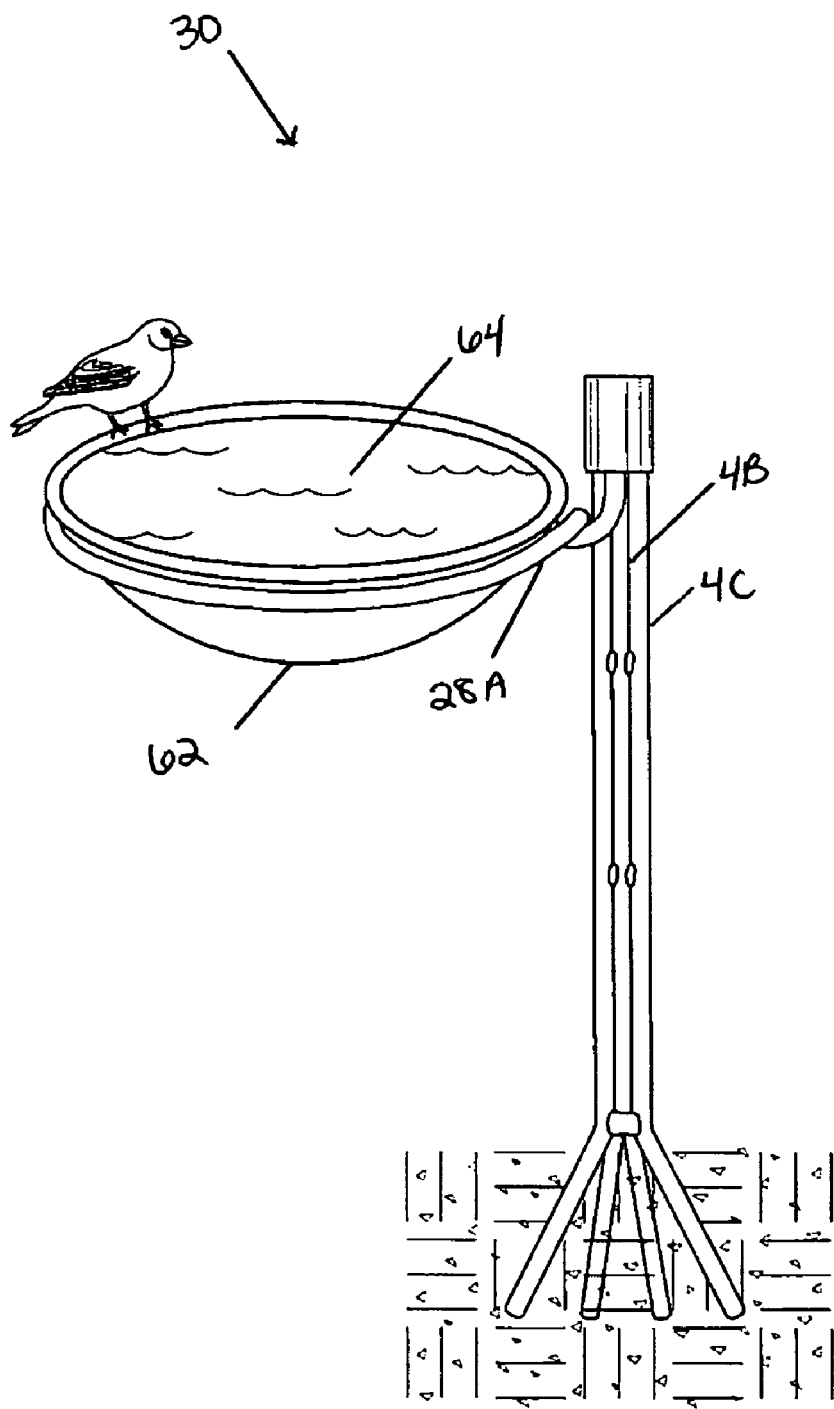
FIG. 14 is an illustration of the third version of FIGS. 5 and 11-13 and positioned to support a vessel holding a liquid, e.g., a water bowl.

FIG. 14 presents a yet alternate configuration of the second version 24 wherein the support arms 28A & 28B are positioned to support a vessel 62 shaped to contain water 64.

Figure 15:
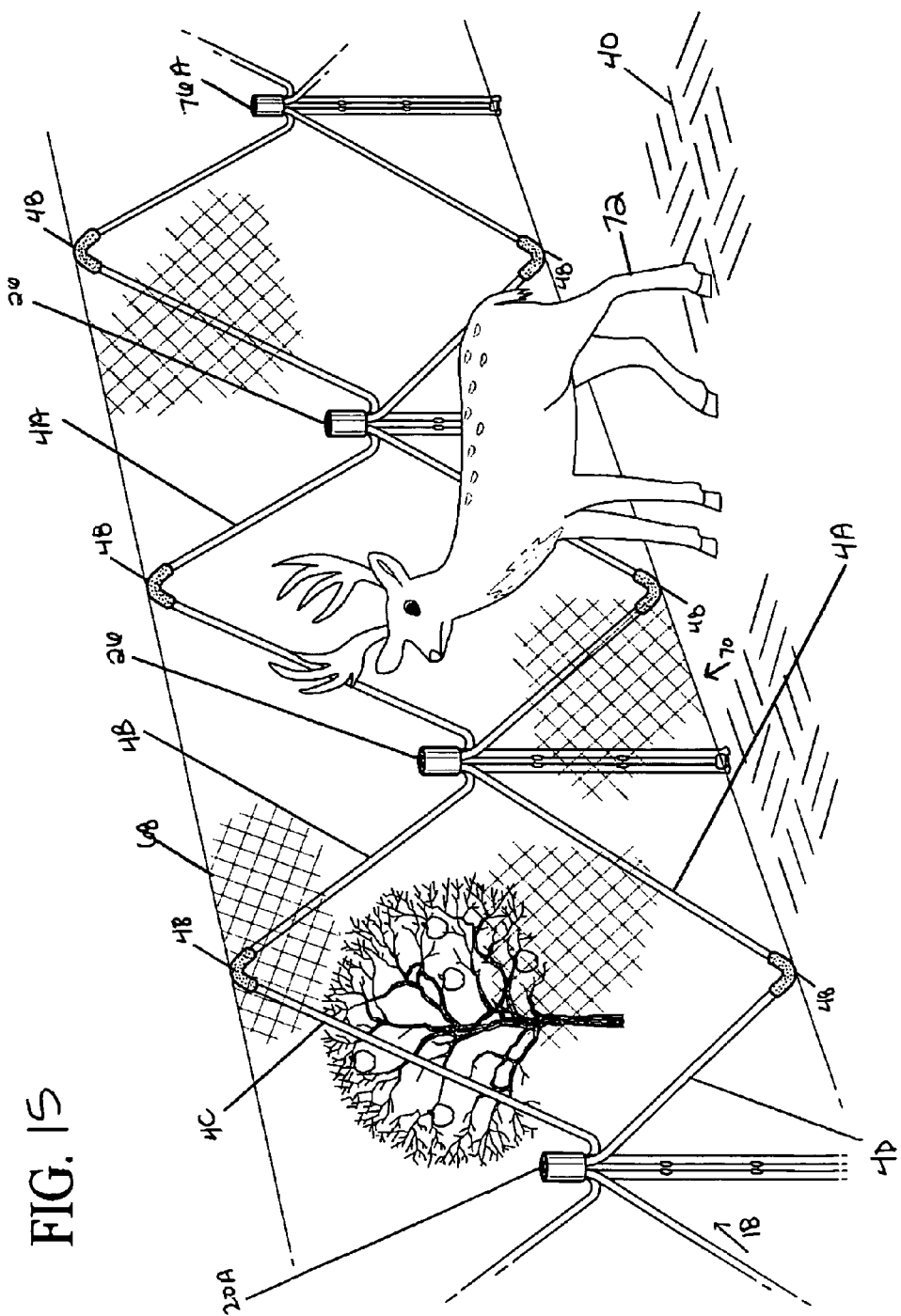
FIG. 15 shows a fourth alternate preferred embodiment of the present invention wherein a plurality of second versions of FIG. 4 are further comprised with a total of four support arms and are mechanically coupled together to form a fence in combination with a fence material.

FIG. 15 shows a fourth alternate preferred embodiment of the present invention, (hereinafter, "the fourth version 66"), that comprises at least two second versions 24 mechanically coupled together to form a fence 68 in combination with a fence material 70. A plurality of second versions 24 may be positioned to protect a tree 46, one or more plants, or an area or structure, from intrusion by human, deer 72, and/or other animals. The fence material 70 may be or comprise a sheet of Ross Deer Netting.™. deer netting material or a sheet of Wild Life Netting.™.

When the fourth version 66 is intended to encircle protect the tree 40 from the deer 62, it is preferable that each support arm 28A-28D have a length in the range from three feet to six feet and that each post section 18 of the second version 24 be at least as long as the longest support arm 28A-28D. It is additionally preferable in certain additional alternate preferred embodiments of the method of the present invention that the second version 24 comprise support arms 28A-28D that are all substantially equal in length within plus or minus 0.5 inches.

Two of the support arms 28A & 28B of the second version 24 are positionable downwards from the collar 26 toward the ground material 40. The two other support arms 28C & 28D of the same second version 24 are positionable upwards and away from the collar 26. A plurality of second versions 24 may be located proximate to each other and may be coupled by one or more coupling elements 48, wherein a downward angled support arm 28A of a first exemplary second version 24 is coupled to a downward angled support arm 28B of a neighboring second version 24, and an upward angled support arm 28C of the first exemplary second version 24 is coupled to an upward angled support arm 28D of the same neighboring second version 24.

Figure 16:
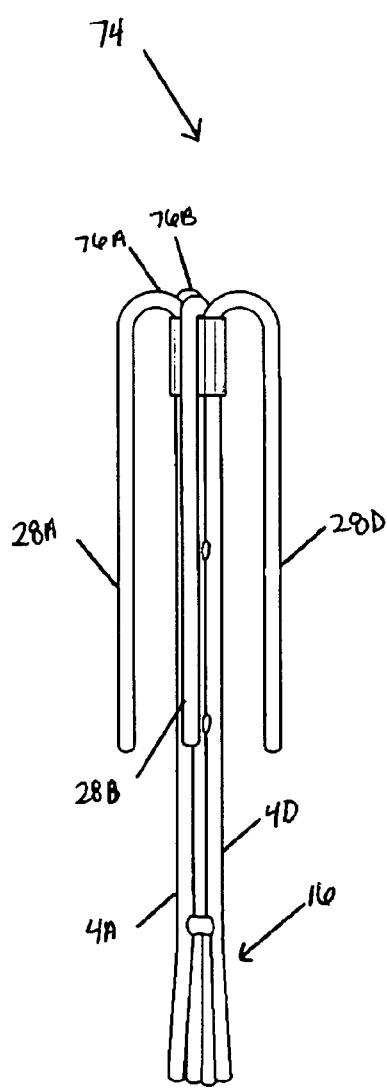
FIG. 16 is an illustration of a fifth alternate preferred embodiment of the present invention, or fourth version, wherein a plurality of support arms initially extend upwards from a collar.
Figure 17:
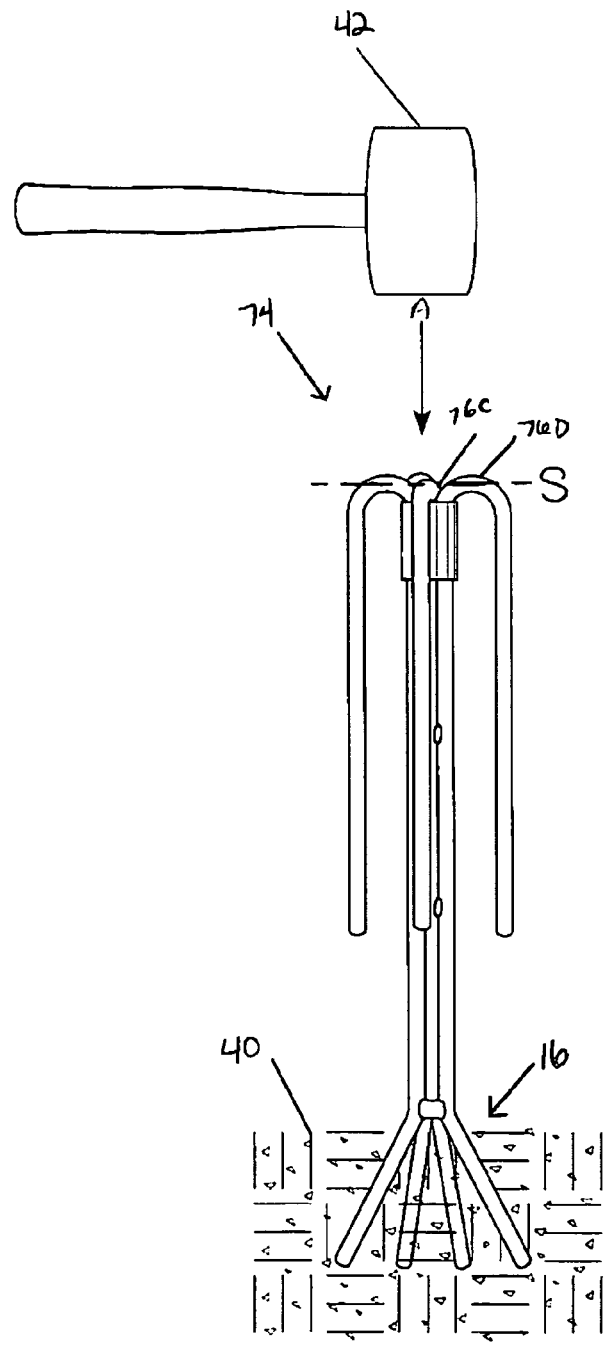
FIG. 17 is an illustration of the fifth version of FIG. 16 as installed into a ground material.

Referring now to FIGS. 16 & 17, FIG. 16 is an illustration of a fifth alternate preferred embodiment of the present invention 74, or fifth version 74, wherein the plurality of support arms 28A-28D are extend upwards from the collar 26. FIG. 17 illustrates a plurality of additional striking points 76A-76B of the fifth version 74 are available to receive a downward force directly from the hammer 42.

Figure 18:
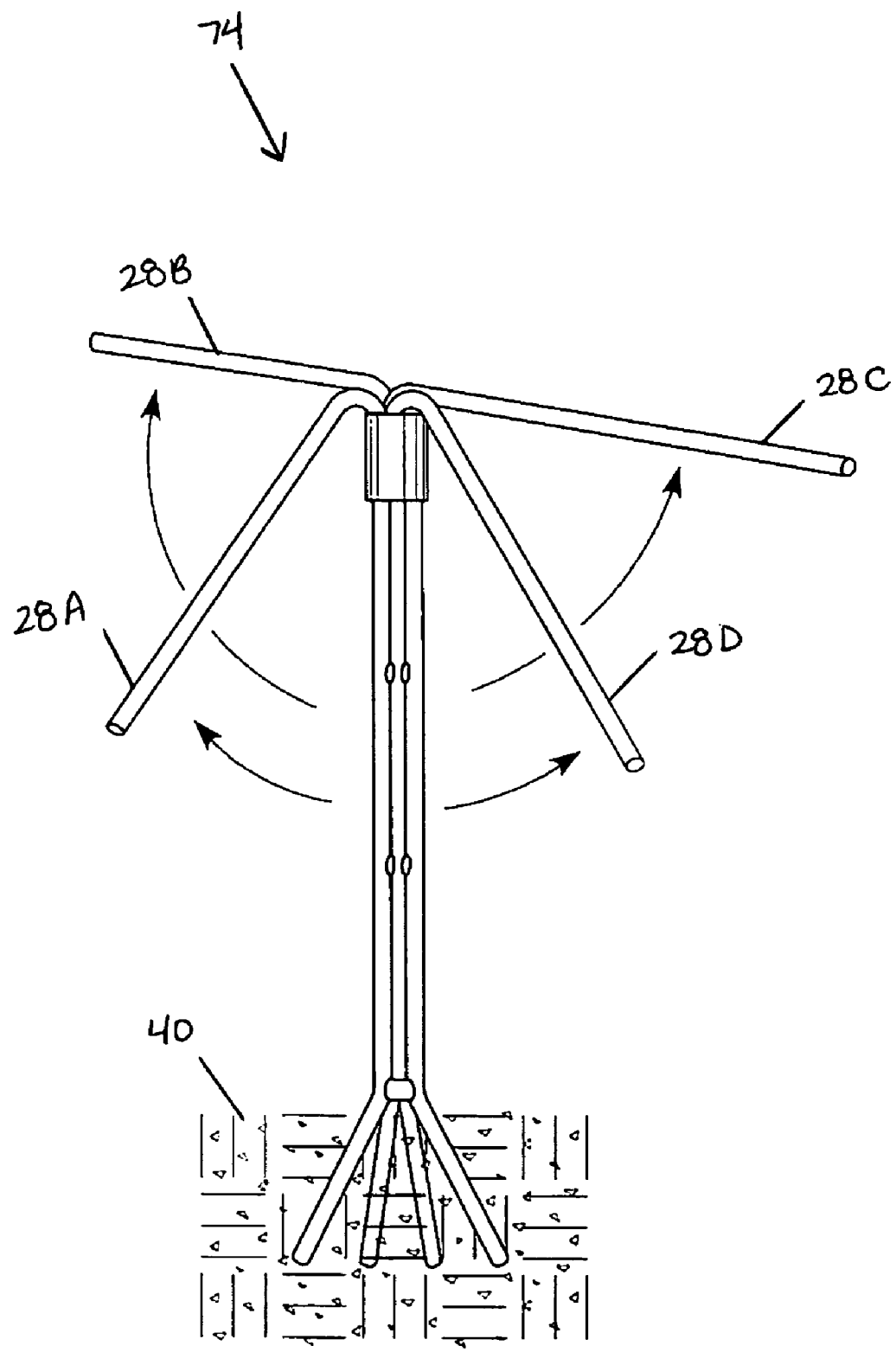
FIG. 18 is an illustration of the fifth version of FIG. 16 in a first deployed state.
Figure 19:
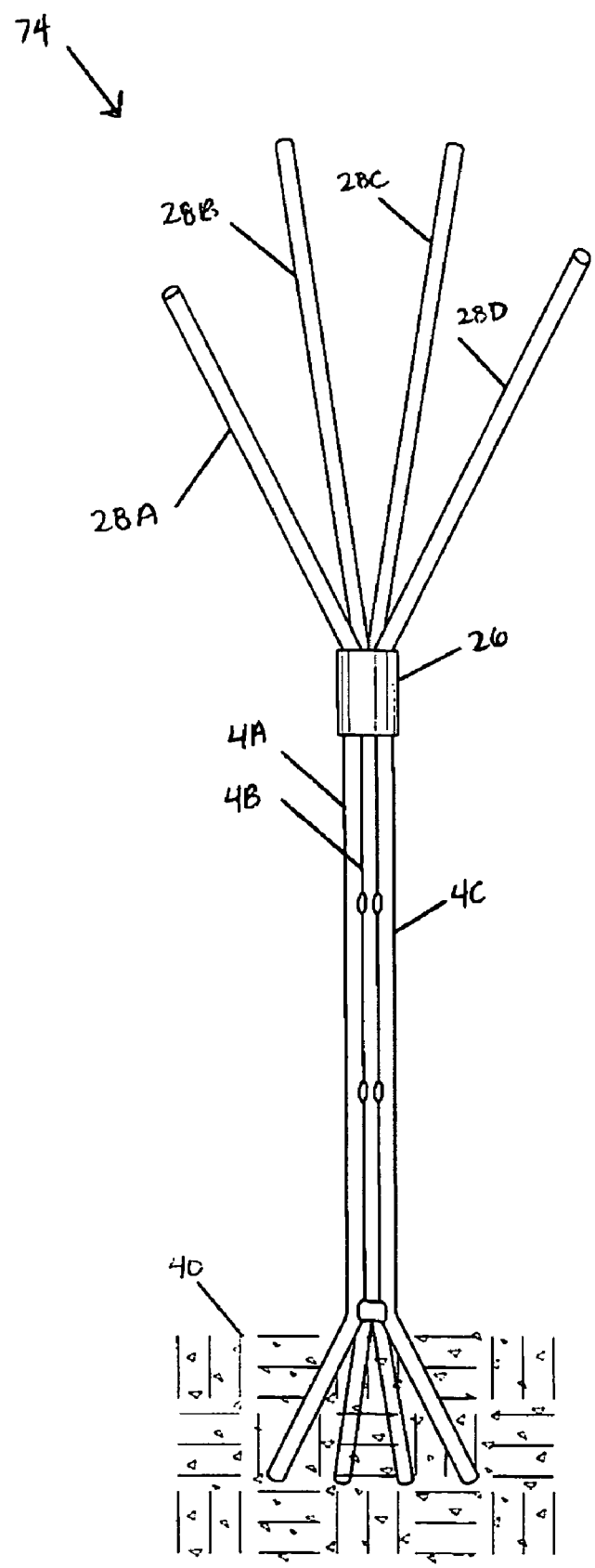
FIG. 19 is an illustration of the fifth version of FIG. 16 in a second deployed state.

Referring now to FIGS. 18 and 19, FIG. 18 partly illustrates the positionable mobility of the support arms 28A-28D. FIG. 19 illustrates the support arms 28A-28D of the fifth version 74 angled upwards and away from the collar 26.

Figure 20:
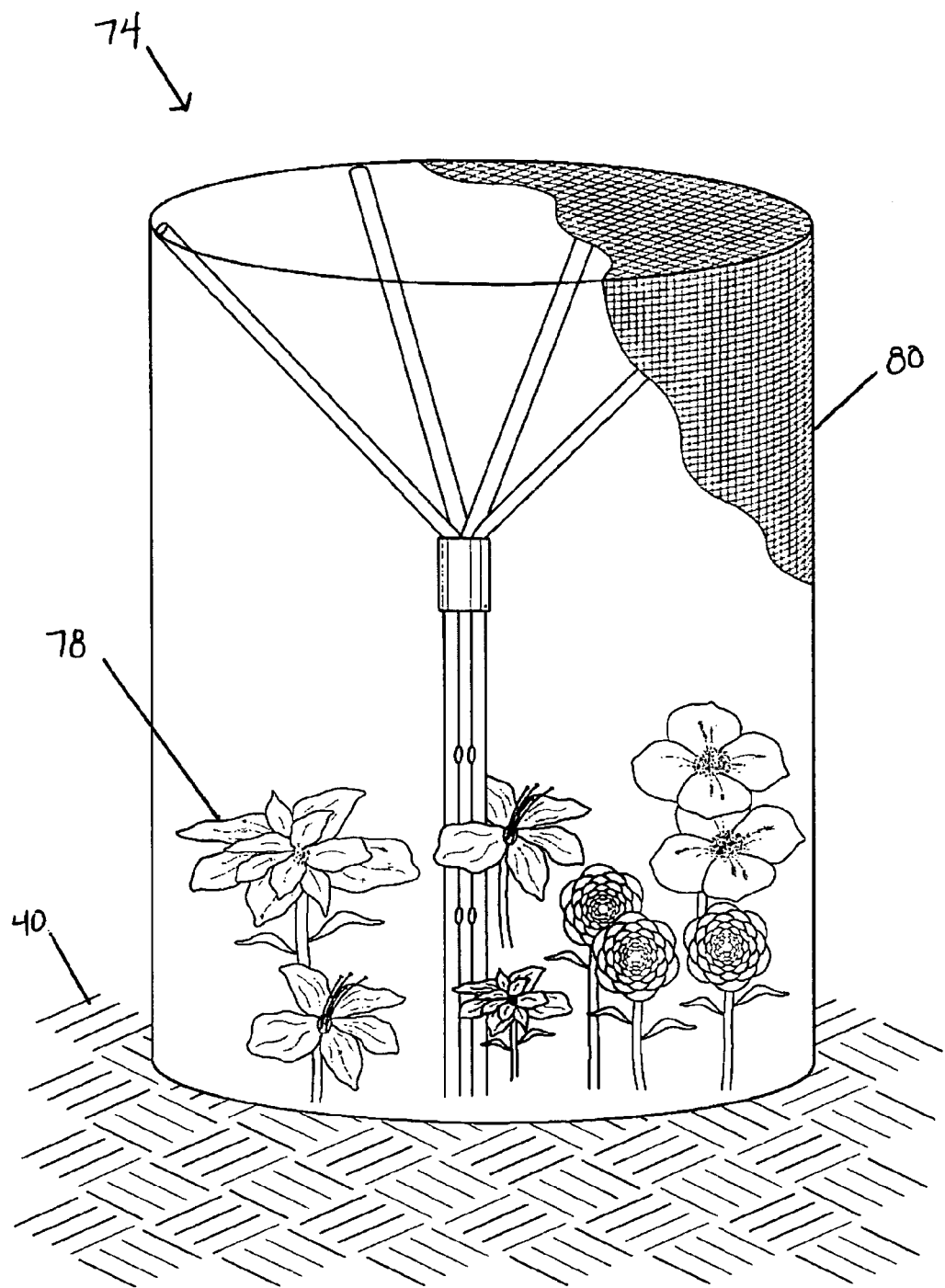
FIG. 20 is an illustration of the fifth version of FIG. 16 located proximate to a plurality of plants and supporting a netting.

FIG. 20 illustrates the fifth version 74 located proximate to a plurality of plants 78 and supporting a netting 80, wherein the netting 80 substantially encloses the plurality of plants 78, e.g., flowering plants, seedlings and shoots. It is understood that the netting 80 may be positioned to extend to, and make contact with, the ground material 40.

Figure 21:
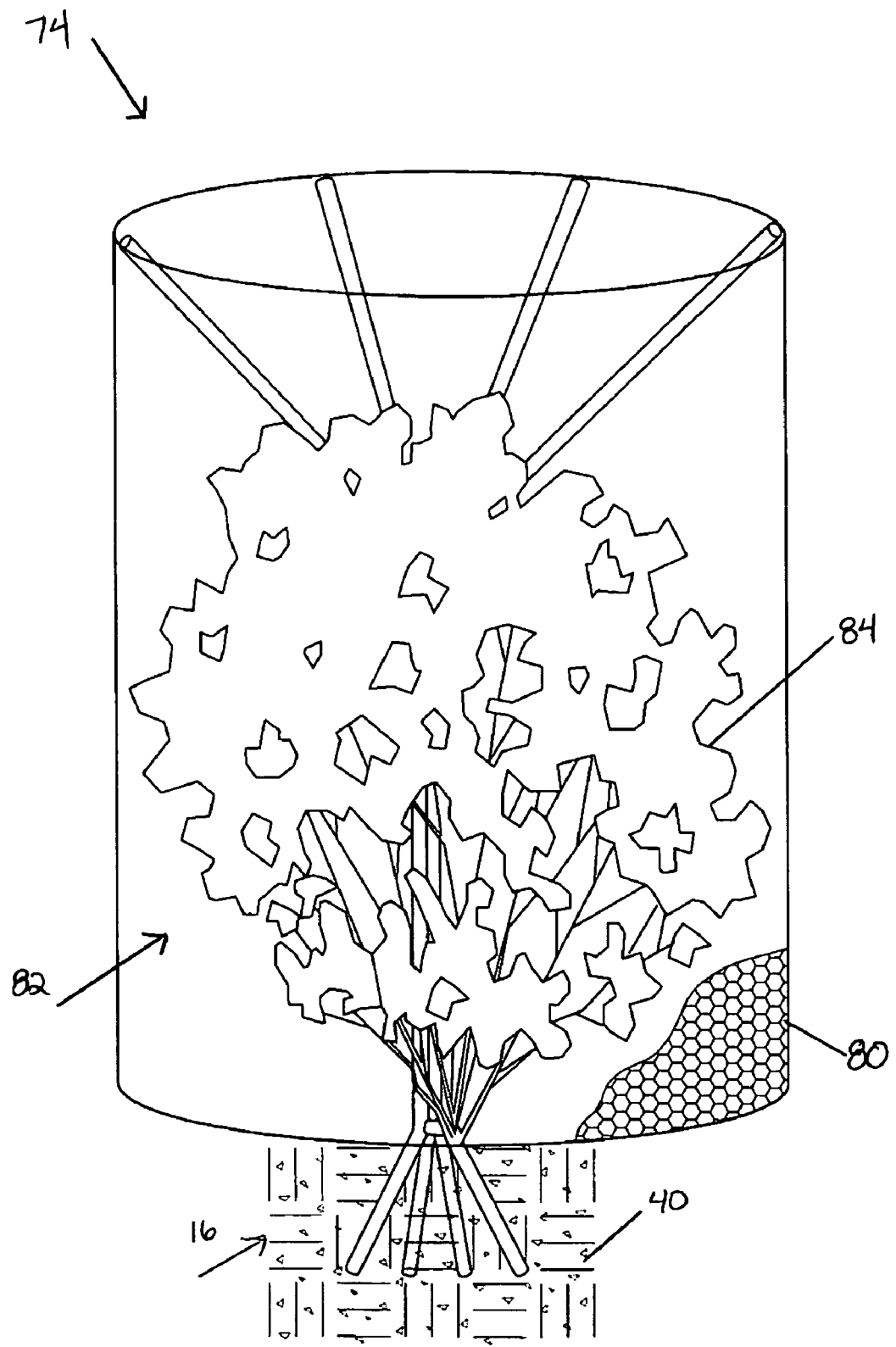
FIG. 21 is an illustration of the fifth version of FIG. 16 supporting the netting of FIG. 20 and enclosing a leaf-bearing plant.

FIG. 21 illustrates the fifth located proximate to a leaf-bearing plant 82 and supporting the netting 80, wherein the netting 80 substantially encloses a leafed region 84 of the leaf-bearing plant 82.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

What is claimed is:

1. A device comprising:
   a. A first elongate element, the first elongate element comprising a first solid cylindrical body having a first anchor end and a first striking end; and
   b. A second elongate element, the second elongate element comprising a second solid cylindrical body having a second anchor end and a second striking end, wherein the first elongate element and the second elongate element are coupled in at least one location between the anchor ends and the striking ends, wherein the device has a first state wherein the first anchor end and the second anchor end are substantively parallel along an elongate axis, and the device further has a second state wherein the first anchor end and the second anchor end are splayed and angle away from the elongate axis.

2. The device of claim 1, wherein each striking end presents a distal striking point, wherein each distal striking point is co-planar within a striking plane that is normal to the elongate axis.

3. The device of claim 1, wherein the elongate elements are coupled in at least two locations between the anchor ends and the striking ends.

4. The device of claim 1, wherein the elongate elements comprise a metal and the elongate elements are coupled by a weld or a press fitting.

5. The device of claim 1, wherein the elongate elements are coupled at a point proximate to the anchor ends.

6. The device of claim 5, wherein the elongate elements are coupled in at least an additional location between the anchor ends and the striking ends.

7. The device of claim 5, wherein the elongate elements comprise a metal and the elongate elements are coupled by a weld.

8. The device of claim 5, wherein each striking end presents a distal striking point that are co-planar along a striking plane that is positioned normal to the elongate axis.

9. The device of claim 1, wherein the elongate element striking ends are coupled to an enclosing collar.

10. The device of claim 9, wherein each striking end presents a distal striking point that is co-planar with a striking side of the collar along a striking plane that is positioned normal to the elongate axis.

11. The device of claim 9, further comprising a coupling point located proximate to the collar.

12. The device of claim 9, wherein the elongate elements comprise metal and are welded with the collar.

13. The device of claim 12, wherein the collar comprises metal and is welded to at least one elongate element.

14. A device comprising:
   a. A plurality of at least three elongate elements, each elongate element having a solid cylindrical body comprising a length, a striking end and an anchor end; and
   b. At least one coupling feature, wherein each elongate element is coupled at a location outside of the elongate element anchor ends, wherein the lengths of the plurality of elongate elements are parallel to an elongate axis, and wherein the device has a first state wherein the anchor ends are substantively parallel along the elongate axis, and the device further has a second state wherein the anchor ends are splayed and angle away from the elongate axis.

15. The device of claim 14, wherein each elongate element comprises metal.

16. The device of claim 15, wherein the coupling feature is a weld or a press fitting.

17. The device of claim 14, wherein each elongate element comprises rebar.

18. An anchoring device for a plant protection arm, the anchoring device comprising:
   a. Two equal lengths of rebar welded at a top weld point and at a lower weld point;
   b. Each length of rebar having a tine extending from the lower weld point, wherein the anchoring device has a first state wherein the tines are substantively parallel along an elongate axis, and the device further has a second state wherein the tines are splayed and angle away from the elongate axis; and
   c. Each length of rebar presents a distal striking point located within a striking plane that is normal to the elongate axis.

\* \* \* \* \*